US012610375B2

(12) United States Patent
Li

(10) Patent No.: US 12,610,375 B2
(45) Date of Patent: Apr. 21, 2026

(54) METHOD FOR PROCESSING PDCCH MONITORING CAPABILITY, TERMINAL, AND NETWORK-SIDE DEVICE

(71) Applicant: VIVO MOBILE COMMUNICATION CO., LTD., Dongguan (CN)

(72) Inventor: Gen Li, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 329 days.

(21) Appl. No.: 18/344,135

(22) Filed: Jun. 29, 2023

(65) Prior Publication Data

US 2023/0354369 A1     Nov. 2, 2023

Related U.S. Application Data

(63) Continuation of application No. PCT/CN2021/142058, filed on Dec. 28, 2021.

(30) Foreign Application Priority Data

Dec. 31, 2020    (CN) .......................... 202011629329.6

(51) Int. Cl.
    *H04W 72/232*        (2023.01)
    *H04W 72/0446*       (2023.01)
(52) U.S. Cl.
    CPC ..... *H04W 72/232* (2023.01); *H04W 72/0446* (2013.01)
(58) Field of Classification Search
    CPC ........... H04W 72/232; H04W 72/0446; H04W 72/23; H04L 5/001; H04L 5/0082;
    (Continued)

(56) References Cited

U.S. PATENT DOCUMENTS

2020/0221428 A1* 7/2020 Moon ................... H04W 72/23
2023/0006796 A1* 1/2023 He ......................... H04L 1/0072
2024/0430899 A1* 12/2024 Grant ................... H04L 5/0053

FOREIGN PATENT DOCUMENTS

CN       112153743  A     12/2020
KR    1020200105406  A     9/2020
            (Continued)

OTHER PUBLICATIONS

AT&T, "Performance Requirement for 1 Symbol PDCCH for LTE-NR Co-existence Scenarios" , 3GPP TSG-RAN WG4 Meeting #87 R4-1807413, May 14, 2018 (May 14, 2018), pp. 1-3.
            (Continued)

*Primary Examiner* — Dady Chery
(74) *Attorney, Agent, or Firm* — The Webb Law Firm

(57)        ABSTRACT

This application discloses a method for processing a PDCCH monitoring capability, a terminal, and a network-side device, belonging to the field of communication technologies. The method includes: determining a physical downlink control channel PDCCH monitoring capability, where the PDCCH monitoring capability represents a restriction condition that needs to be met by a slot monitorable by the terminal (e.g., UE); and sending the PDCCH monitoring capability, where the PDCCH monitoring capability includes any one or a combination of the following: a monitoring occasion is only on a predetermined slot of a radio frame, a radio subframe, or a slot group; or a monitoring occasion is on any slot of a radio frame, a radio subframe, or a slot group.

20 Claims, 5 Drawing Sheets

(58) Field of Classification Search
     CPC ... H04L 5/0016; H04L 5/0053; H04L 5/0091;
                  H04L 5/14; H04L 5/1469; H04L 5/0094
     See application file for complete search history.

(56)                  References Cited

FOREIGN PATENT DOCUMENTS

| | | | |
|---|---|---|---|
| WO | 2020121412 | A1 | 6/2020 |
| WO | 2020206086 | A1 | 10/2020 |
| WO | 2020218343 | A1 | 10/2020 |
| WO | 2020222589 | A1 | 11/2020 |
| WO | 2020227142 | A1 | 11/2020 |

OTHER PUBLICATIONS

Huawei et al. "Clarifications on Rel-15 UE Features" , 3GPP TSG RAN WG1 Meeting #96bis R1-1905518, Apr. 8, 2019 (Apr. 8, 2019), entire document, 6 pgs.
International Patent Application No. PCT/CN2021/142058, International Search Report and Written Opinion with Partial English Machine Translation mailed Mar. 21, 2022, 2021, 4 pages.

* cited by examiner

12

Network side
device 11                11

Terminal        Terminal

Start

Determine a PDCCH monitoring capability of a physical downlink control
channel                                                                    210

Send the PDCCH monitoring capability                                       220

End

Subframe #0                            Subframe #1

Slot group 1        å                                    å                        å

Slot group 2

Slot group 3

METHOD FOR PROCESSING PDCCH MONITORING CAPABILITY, TERMINAL, AND NETWORK-SIDE DEVICE

CROSS-REFERENCE TO RELATED APPLICATIONS

This application is a continuation of International Application No. PCT/CN2021/142058, filed on Dec. 28, 2021, which claims priority to Chinese Patent Application No. 202011629329.6, filed in China on Dec. 31, 2020, the entire content of which is incorporated herein by reference.

TECHNICAL FIELD

This application belongs to the field of communication technologies, and in particular, to a method for processing a PDCCH monitoring capability, a terminal, and a network-side device.

BACKGROUND

When new radio (NR) operates in a high frequency band (for example, >52.6 GHz), granularity of a symbol and granularity of a slot (slot) decrease due to increase of a subcarrier spacing (SCS). If a physical downlink control channel (PDCCH) monitoring capability is still defined according to granularity of per slot or per span (per span, a span includes a plurality of symbols), complexity of implementation of a terminal (UE) will be greatly increased.

Therefore, how to propose a method that can reduce complexity of implementing PDCCH monitoring by the UE is of great significance.

SUMMARY

Embodiments of this application provide a method for processing a PDCCH monitoring capability, a terminal, and a network-side device.

According to a first aspect of the present disclosure, a method for processing a PDCCH monitoring capability is provided, applied to a terminal, and the method including:

determining a physical downlink control channel PDCCH monitoring capability, where the PDCCH monitoring capability represents a restriction condition that needs to be met by a slot monitorable by the terminal (e.g., UE); and sending the PDCCH monitoring capability, where the PDCCH monitoring capability includes any one or a combination of the following:

a monitoring occasion is only on a predetermined slot of a radio frame, a radio subframe, or a slot group; or a monitoring occasion is on any slot of a radio frame, a radio subframe, or a slot group.

According to a second aspect of the present disclosure, a method for processing a PDCCH monitoring capability is provided, applied to a network-side device, and the method including:

receiving the PDCCH monitoring capability; and sending a PDCCH based on the PDCCH monitoring capability, where the PDCCH monitoring capability includes any one or a combination of the following:

a monitoring occasion is only on a predetermined slot of a radio frame, a radio subframe, or a slot group; or a monitoring occasion is on any slot of a radio frame, a radio subframe, or a slot group.

According to a third aspect of the present disclosure, an apparatus for processing a PDCCH monitoring capability is provided, applied to a terminal, and the apparatus including:

a capability determining module, configured to determine a physical downlink control channel PDCCH monitoring capability, where the PDCCH monitoring capability represents a restriction condition that needs to be met by a slot monitorable by the terminal (e.g., UE); and a capability sending module, configured to send the PDCCH monitoring capability, where the PDCCH monitoring capability includes any one or a combination of the following:

a monitoring occasion is only on a predetermined slot of a radio frame, a radio subframe, or a slot group; or a monitoring occasion is on any slot of a radio frame, a radio subframe, or a slot group.

According to a fourth aspect of the present disclosure, an apparatus for processing a PDCCH monitoring capability is provided, applied to a network-side device, the apparatus including:

a capability receiving module, configured to receive the PDCCH monitoring capability; and a channel sending module, configured to send a PDCCH based on the PDCCH monitoring capability, where the PDCCH monitoring capability at least includes any one or a combination of the following:

a monitoring occasion is only on a predetermined slot of a radio frame, a radio subframe, or a slot group; or a monitoring occasion is on any slot of a radio frame, a radio subframe, or a slot group.

According to a fifth aspect of the present disclosure, a terminal is provided, including a processor, a memory, and a program or an instruction stored in the memory and executable on the processor, where the program or instruction, when executed by the processor, implements the steps of the method according to the first aspect.

According to a sixth aspect of the present disclosure, a network-side device is provided, where the network-side device includes a processor, a memory, and a program or an instruction that is stored in the memory and executable on the processor, where the program or instruction are executed by the processor to implement the steps of the method according to the third aspect.

According to a seventh aspect of the present disclosure, a readable storage medium is provided, storing a program or an instruction, where the program or instruction, when executed by a processor, implements the steps of the method according to the first aspect, or implements the steps of the method according to the second aspect.

According to an eighth aspect of the present disclosure, a chip is provided, including a processor and a communication interface, where the communication interface is coupled to the processor, and the processor is configured to run a program or an instruction on a network-side device to implement the method according to the first aspect, or implement the method according to the second aspect.

According to a ninth aspect of the present disclosure, a computer program product is provided, being stored in a non-volatile storage medium, where the computer program product, when executed by at least one processor, implements the method according to the first aspect, or implements the method according to the second aspect.

DETAILED DESCRIPTION

The technical solutions in embodiments of this application are clearly described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The specification and claims of this application, and terms "first" and "second" are used to distinguish similar objects, but are unnecessarily used to describe a specific sequence or order. It may be understood that the terms used in such a way is interchangeable in proper circumstances, so that the embodiments of this application can be implemented in other sequences than the sequence illustrated or described herein. In addition, objects distinguished by "first" and "second" are usually of Type, and the number of objects is not limited. For example, a first object may be one or more than one. In addition, in the specification and claims, "and/or" means at least one of the connected objects, and the character "I" generally indicates an "or" relation between associated objects.

It should be noted that, the technology described in this embodiment of this application is not limited to a long term evolution (LTE)/LTE evolution (LTE-A) system, but may further be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in this embodiment of this application are often used interchangeably, and the described technologies may be used both for the systems and radio technologies mentioned above and may also be used for other systems and radio technologies. However, the following descriptions describe a new radio NR) system for the objective of being used as an example, and NR terms are used in most of the descriptions below. These technologies may also be applied to applications other than NR system applications, such as a $6^{th}$ generation (6G) communication system.

Figures 1, 2, 3:
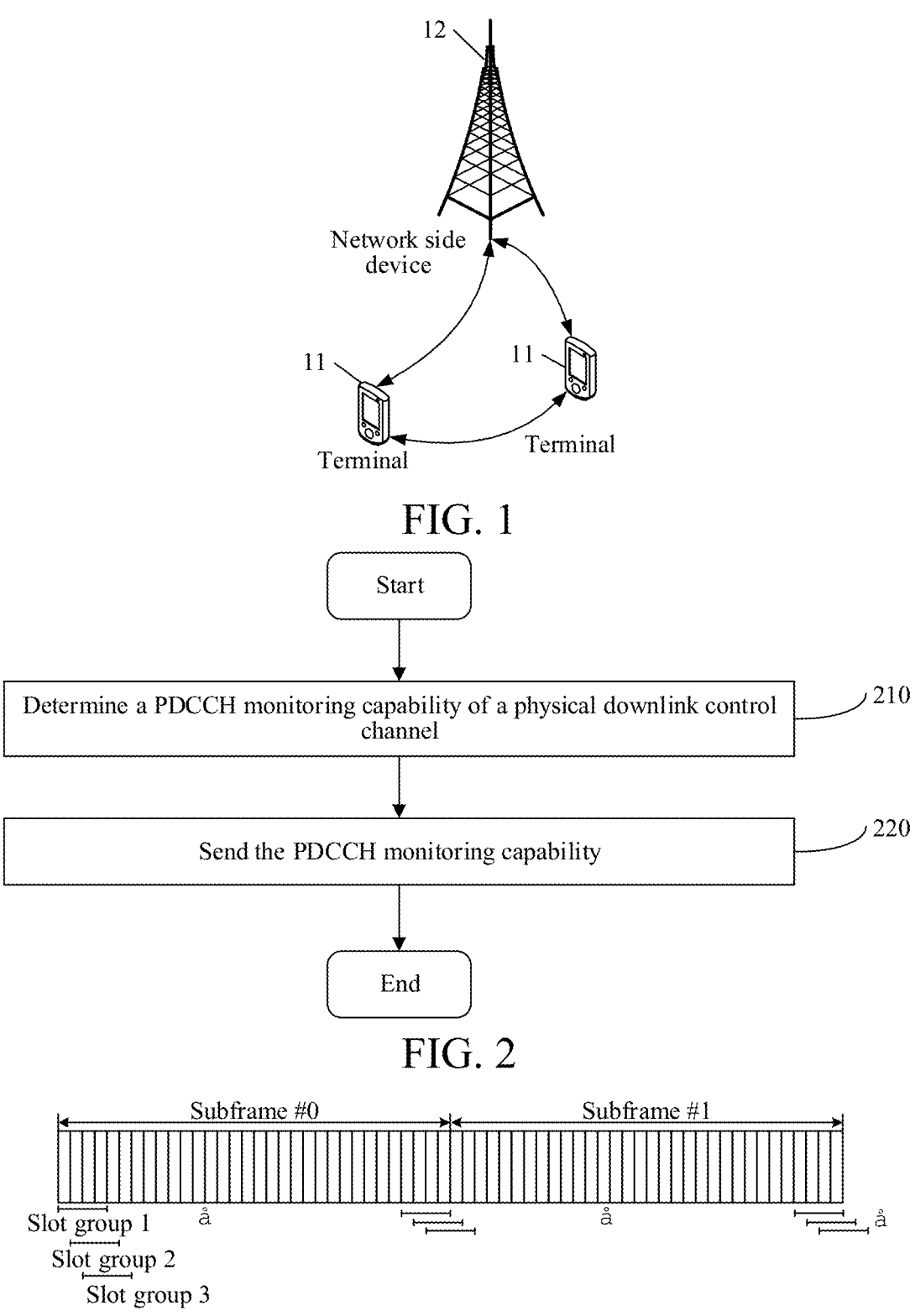
FIG. 1 is a block diagram of a wireless communication system according to an embodiment of this application.
FIG. 2 is a schematic flowchart 1 of a method for processing a PDCCH monitoring capability according to an embodiment of this application.
FIG. 3 is a schematic diagram 1 of a position of a slot group according to an embodiment of this application.

FIG. 1 is a block diagram of a wireless communication system to which an embodiment of this application may be applied. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer, or referred to as a notebook computer, a personal digital assistant (PDA), a palmtop computer, a netbook, an ultra-mobile personal computer (UMPC), a mobile Internet device (MID), a wearable device, or vehicle user equipment (VUE), and pedestrian user equipment (PUE). The wearable device includes: a bracelet, headphones, glasses, or the like. It should be noted that in this embodiment of this application, a specific type of the terminal 11 is not limited. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a household NodeB, a household evolved NodeB, a wireless local area network (WLAN) access point, a wireless fidelity (WiFi) node, a transmission reception point (TRP) or some other proper terms in the field. Provided that the same technical effect is achieved, the base station is not limited to a specific technical vocabulary. It should be noted that in this embodiment of this application, only a base station in the NR system is used as an example, but a specific type of the base station is not limited.

In order to more fully understand the technical solutions provided in the embodiments of this application, the following content is currently introduced:

1. Definition of a PDCCH monitoring capability in NR Release 15 (Release 15, Rel-15)

In the NR Rel-15, the PDCCH monitoring capability is classified into a mandatory (Mandatory) capability and an optional capability.

First, a capability of a mandatory capability without capability signaling is as follows:

Control-resource set (CORESET): Each bandwidth Part, bandwidth part (BWP) of each cell (Cell) may be configured with one additional CORESET based on CORESET 0.

Frequency range (FR) 1: a bitmap (bitmap) of six resource blocks (RB)+one to three symbols.

FR2: For Type 0, Type 0A, and Type 2 common search space (CSS) and Type 1 with non-dedicated radio resource control (RRC) configuration, a bitmap of 6 RBs+one to three symbols; and for Type 1 with dedicated RRC configuration, Type 3, and USS, the bitmap of 6 RBs+one to two symbols.

A bundle size of a resource element group (REG): 2/3/6.

Interleaved and non-interleaved control channel element (CCE) to REG mapping.

Support configuring a precoder granularity size of a high-level parameter as an REG bundle size.

Support demodulation reference signal (DM-RS) scrambling.

Support configuring one or more transmission configuration indication (TCI) states (states).

Unicast PDCCH transmission in CSS and user specific search space (USS)

Aggregation level (AL) 1, 2, 4, 8, and 16.

For the scheduled secondary cell (SCell), each BWP has a maximum of three search space (SS) sets (sets) per slot (according to definition of scheduling Cell), and the restriction is before performing SS dropping (search space dropping).

For Type 1 with dedicated RRC configuration, Type 3, and USS, monitoring occasions (Monitoring occasions) are in the first three symbols of a slot.

For Type 0, Type 0A, and Type 2 CSS and Type 1 with non-dedicated RRC configuration, monitoring occasions may be any symbol in a slot, and in a single (single) span of a slot, such as three continuous orthogonal frequency division multiplexing (OFDM) symbols.

Support monitoring of downlink control information (Downlink Control Information, DCI) 0_0, 0_1, 1_0, and 1_1.

For a frequency division duplexing (FDD) system, and for each scheduled component carrier (CC), only DCI transmitted by one scheduling downlink (DL) unicast (unicast) and DCI transmitted by one scheduling uplink (UL) unicast are processed on each slot.

For a time division duplex (TDD) system, and for each scheduled CC, only DCI transmitted by one scheduling DL unicast and DCI transmitted by two scheduling UL unicasts are processed on each slot.

Next, a capability of a mandatory capability with capability signaling is as follows:

CORESET in FR2

For Type 1 with dedicated RRC configuration, Type 3 and USS, the bitmap of 6 RBs+three symbols.

Finally, the capability of the optional capability is as follows:

pdcchMonitoringSingleOccasion

FR1: indicates that the UE supports receiving the PDCCH scrambled by a cell-radio network temporary identifier (C-RNTI) and a configured scheduling-radio network temporary identifier (CS-RNTI) in any three continuous symbols of a slot of 15 KHz.

pdcch-MonitoringAnyOccasions withoutDCI-gap: for Type 1 with dedicated RRC configuration, Type 3, and USS, a monitoring occasion is any symbol in a slot, and meets a restriction of a blind detection (BD) budget.

withDCI-gap: for Type 1 with dedicated RRC configuration, Type 3, and USS, a monitoring occasion is in any symbol of a slot, but any two continuous PDCCHs scrambled by a C-RNTI, an MCS-C-RNTI, or a CS-RNTI need to meet a restriction of a gap: two symbols for 15 KHz (15 KHz is two symbols), four symbols for 30 KHz (30 KHz is four symbols), seven symbols for (60 KHz, NCP) ((60 KHz, NCP) is seven symbols), and fourteen symbols for 120 KHz (120 KHz is fourteen symbols), and meet the restriction of the BD budget.

pdcch-MonitoringAnyOccasionsWithSpanGap

Determine a span pattern according to a (X, Y) value of a UE report (reporting) configured by monitoring occasions of all SS: a span pattern of each slot is the same; a starting position of a first span of the span pattern is a position of a first monitoring occasion of any slot, a span length is max{maximum value of all CORESET durations, minimum value of Y in the UE reported candidate value}, and a length of a last span may be shorter; and a starting position of a next span is a first position of a monitoring occasion not included in a first span.

Check whether the span pattern meets an (X, Y) restriction of at least one report.

2. Definition of a PDCCH monitoring capability of NR Rel-16

In the NR Rel-16, all PDCCH monitoring capabilities are optional capabilities, as follows:

2.1 pdcch-Monitoring-r16: different from Rel 15, per (Per) physical downlink shared channel (PDSCH) processing type (processing type) and per SCS may report a value of a supported span, and per span conforms to a corresponding BD/CCE restriction.

2.2. pdcch-MonitoringMixed-r16: supports different serving cells (serving cell) to be configured with different monitoring capabilities (pdcch monitoring capability).

2.3 pdcch-MonitoringCA-r16: the UE reports pdcch-Monitoring-r16, configures a maximum quantity of monitoring cells (monitoring cells) when performing per span BD and CCE restriction, and simultaneously indicates whether the supported span arrangement (span arrangement) is aligned (aligned).

The method for processing a PDCCH monitoring capability provided in the embodiments of this application is described in detail below by using specific embodiments and application scenarios with reference to the accompanying drawings.

FIG. 2 is a schematic flowchart 1 of a method for processing a PDCCH monitoring capability according to an embodiment of this application. As shown in FIG. 2, the embodiments of this application provide a method for processing a PDCCH monitoring capability. The method is applied to a terminal, and may include:

S210. Determine a physical downlink control channel PDCCH monitoring capability, where the PDCCH monitoring capability represents a restriction condition that needs to be met by a slot monitorable by the terminal (e.g., UE); and S220. Send the PDCCH monitoring capability, where PDCCH monitoring capability includes any one or a combination of the following:

a monitoring occasion is only on a predetermined slot of a radio frame, a radio subframe, or a slot group; or a monitoring occasion is on any slot of a radio frame, a radio subframe, or a slot group.

It is to be noted that an execution entity of the method may be a terminal. The technical solutions of this application will be described in detail below by using the terminal performing the method as an example.

First, the UE may determine the PDCCH monitoring capability, that is, determine a restriction condition that needs to be met by the slot monitorable by the UE.

After determining the PDCCH monitoring capability, the UE may send the PDCCH monitoring capability to the network, so that the network configures a corresponding resource for the UE according to the PDCCH monitoring capability, such as configuring a corresponding PDCCH for the UE.

In an embodiment, in a first preset case, the monitoring occasion is only on the predetermined slot of the radio frame, the radio subframe, or the slot group; and in a second preset case, the monitoring occasion is on any slot of the radio frame, the radio subframe, or the slot group.

The first preset case may be a condition for all search space or a condition for Type 1 with dedicated radio resource control RRC configuration, Type 3, and user-specific search space USS.

The second preset case may be a condition for all search space or a condition for Type 0, Type 0A, Type 2 common search space CSS, and Type 1 with non-dedicated RRC configuration.

In the first preset case, the monitoring occasion (the occasion at which the UE performs PDCCH monitoring) may be only on the predetermined slot of the radio frame, the radio subframe, or the slot group. That is, in the first preset case, the UE may perform monitoring on the PDCCH on the predetermined slot.

In the second preset case, the monitoring occasion may be on any slot of the radio frame, the radio subframe, or the slot group. That is, in the second preset case, the UE may perform monitoring on the PDCCH on any slot of the radio frame, the radio subframe, or the slot group.

The method for processing a PDCCH monitoring capability provided in the embodiments of this application determine to perform monitoring on the PDCCH on the predetermined slot or any slot of the radio frame, the radio subframe, or the slot group for different conditions. Compared with the related art in which the PDCCH monitoring capability is mechanically defined according to granularity of per slot or per span, complexity of PDCCH monitoring implemented by the UE may be effectively reduced, thereby significantly improving communication efficiency and reducing energy consumption of the UE, and there are very broad application prospects.

In an embodiment of this application, the predetermined slot may include any one of the following:

a top preset quantity of slots in the radio frame, the radio subframe, or the slot group;

a last preset quantity of slots of the radio frame, the radio subframe, or the slot group; or slots spaced by a preset quantity of slots in the radio frame, the radio subframe, or the slot group.

The preset quantity may be, for example, 2, 3, or the like, and a specific size may be adjusted according to actual needs, which is not specifically limited in the embodiments of this application.

When the preset quantity is 2, the predetermined slots may be the first 2 or last 2 slots of the radio frame, the first 2 or last 2 slots of the radio subframe, or the first 2 or last 2 slots of the slot group.

The preset quantity of slots may be, for example, 4, 5, or the like, and a specific size may be adjusted according to actual needs, which is not specifically limited in the embodiments of this application.

When the preset quantity of slots is 4, the predetermined slot may be a slot every 4 slots in the radio frame. For example, when the first predetermined slot is the second slot of the radio frame, the subsequent predetermined slot (the second predetermined slot, the third predetermined slot, or the like) may be the 7th slot, the 12th slot, or the like of the radio frame; the predetermined slot may further be a slot every 4 slots in the radio subframe. For example, when the first predetermined slot is the second slot of the radio subframe, the subsequent predetermined slot (the second predetermined slot, the third predetermined slot, or the like) may be the 7th slot, the 12th slot, or the like of the radio subframe; and the predetermined slot may further be a slot every 4 slots in the slot group. For example, when the first predetermined slot is the second slot of the slot group, the subsequent predetermined slot (the second predetermined slot, the third predetermined slot, or the like) may be the 7th slot, the 12th slot, or the like of the slot group.

The method for processing a PDCCH monitoring capability provided in the embodiments of this application improves flexibility of PDCCH monitoring because the predetermined slot may be on a plurality of slots of the radio frame, the radio subframe, or the slot group.

In an embodiment, the PDCCH monitoring capability further includes any one of the following:

in a first preset case, the monitoring occasion is on any slot of the radio frame, the radio subframe, or the slot group; or in a first preset case, the monitoring occasion is on any slot of the radio frame, the radio subframe, or the slot group, and any continuous PDCCHs meet a preset gap.

The preset gap may be preset or determined according to a specific size of the SCS. For example, for SCS of 480 KHz, the preset gap may be four slots, and for SCS of 960 KHz, the preset gap may be eight slots.

It is to be noted that the PDCCH monitoring capability may be used as an optional capability of PDCCH monitoring. That is, when the UE has the PDCCH capability, the UE reports the capability to the network, and the network configures a corresponding resource for the UE only in a case that the UE reports the capability.

Correspondingly, the PDCCH monitoring capability in the foregoing embodiment may be used as the mandatory capability of PDCCH monitoring (in a first preset case, the monitoring occasion is only on the predetermined slot of the radio frame, the radio subframe, or the slot group; and in the second preset case, the monitoring occasion may be on any slot of the radio frame, the radio subframe, or the slot group). That is, the PDCCH monitoring capability may be specified in a protocol: the UE needs to implement monitoring on the PDCCH according to the monitoring capability, and the network needs to configure a corresponding resource for the UE according to the monitoring capability.

Certainly, the optional capability and the mandatory capability of the PDCCH monitoring may be exchanged according to the needs of the slot.

For example, in an embodiment, the optional capability of the PDCCH monitoring (in the first preset case, the monitoring occasion is on any slot of the radio frame, the radio subframe, or the slot group, or in the preset case, the monitoring occasion is on any slot of the radio frame, the radio subframe, or the slot group, and any continuous PDCCHs meet a preset gap.) may actually be used as the mandatory capability mandatorily followed by the PDCCH monitoring performed by the UE and the network; the mandatory capability of the PDCCH monitoring (in a first preset case, the monitoring occasion is only on the predetermined slot of the radio frame, the radio subframe, or the slot group; and in the second preset case, the monitoring occasion may be on any slot of the radio frame, the radio subframe, or the slot group) may actually be used as an optional capability optionally followed by the PDCCH monitoring performed by the UE and the network.

Certainly, the optional capability and the mandatory capability of the PDCCH monitoring may further be combined according to the needs of the slot.

For example, in an embodiment, the optional capability and the mandatory capability of the PDCCH monitoring may actually be used as the mandatory capability mandatorily followed by the PDCCH monitoring performed by the UE and the network; and may actually also be used as an optional capability optionally followed by the PDCCH monitoring performed by the UE and the network.

The method for processing the PDCCH monitoring capability provided in the embodiments of this application may further improve the flexibility of implementing PDCCH monitoring by flexibly dividing the PDCCH monitoring capability into the mandatory capability and the optional capability according to actual needs.

In an embodiment, the slot group may be determined in the following manners:

determining a quantity N of slots or a set {Ni} of a quantity of slots included in the slot group; and it may be understood that each slot group corresponds to a quantity N of slots, and when the quantity of slot groups is more than one, there is a quantity N (N may be a different value) of a plurality of slots, and the quantity N of the plurality of slots constitutes a set {Ni} of a quantity of slots. Each element in the set {Ni} of the quantity of slots (the quantity N of slots of different slot groups) may be the same as or different from each other.

A position of the slot group is determined based on the determined quantity N of slots or the set {Ni} of the quantity of slots.

Optionally, a value N of the quantity of slots or a value set {Ni} may be obtained through one of the following manners:

Manner 1: obtaining through configuration of a network; and the network may allocate a quantity of slots to each slot group according to actual needs, such as a parameter (size, frequency, or the like) of the to-be-transmitted data, time domain resource occupancy, or the like, so that the quantity N of slots to be included in the slot group (when there is only one slot group) or the set {Ni} of the quantity of slots (when there are a plurality of slot groups) may be determined.

Manner 2: obtaining through a quantity of a plurality of physical downlink shared channels PDSCHs or a quantity of slots that are schedulable by a time domain scheduling parameter in downlink control information DCI; and the network may determine the quantity N of slots according to the quantity of a plurality of PDSCHs or slots that are schedulable by the time domain scheduling parameter in DCI. The quantity N of slots may be in a one-to-one correspondence with a quantity of a plurality of PDSCHs or slots that are schedulable, or may be in a specific ratio to the quantity of a plurality of PDSCHs or slots that are schedulable. For example, the ratio may be 2:1. For example, when the quantity of the plurality of PDSCHs or slots that are schedulable is 4, the quantity N of slots may be 8.

All quantities of the plurality of PDSCHs or slots that are schedulable may be used as the quantity of slots to be included in different slot groups. A maximum value or a minimum value of the quantity of the plurality of PDSCHs or slots that are schedulable by the time domain scheduling parameter in DCI may also be used as the quantity of slots to be included in the slot group.

Manner 3: obtaining through a capability parameter reported by the UE, where the capability parameter includes the quantity N of slots or the set {Ni} of the quantity of slots, or includes a quantity of a plurality of PDSCHs or a quantity of slots that are schedulable by a time domain scheduling parameter in DCI; and the quantity N of slots or the set {Ni} of the quantity of slots may be determined according to the capability parameter reported by the UE to the network. The capability parameter is a parameter related to the PDCCH monitoring capability of the UE.

The capability parameter may include the quantity N of slots or the set {Ni} of the quantity of slots. When the quantity N of slots is more than one, the quantity N of all slots may be respectively used as the quantity of slots to be included in different slot groups; or a maximum value, a minimum value, a median value, or an average value of the quantity N of all slots may be used as the quantity of slots to be included in the slot group.

The capability parameter may further include the quantity of a plurality of PDSCHs or the quantity of slots that are schedulable by the time domain scheduling parameter in DCI. All values of the quantity of the plurality of PDSCHs or the quantity of slots that are schedulable by one time domain scheduling parameter in DCI may be used as the quantity of slots to be included in different slot groups. A maximum value, a minimum value, a median value, or an average value of the quantity of the plurality of PDSCHs or the quantity of slots that are schedulable by one time domain scheduling parameter in DCI may also be used as the quantity of slots to be included in the slot group.

In an embodiment, the capability parameter may further include one or more of the following parameters:

the quantity of slots included in the slot group;

a gap (gap) value between the slots or the slot groups; or a BD budget value or CCE budget value.

The BD budget value may refer to a budget value of a quantity of candidate PDCCHs (PDCCH Candidate) corresponding to the predetermined slot; and the CCE budget value may refer to a budget value of a quantity of CCEs required for blind detection.

After receiving the capability parameter reported by the UE, the network configures a corresponding resource for the UE according to the capability parameter, so that the UE performs monitoring on the PDCCH.

Manner 4: obtaining through the quantity N of slots or the set {Ni} of the quantity of slots predefined in a protocol.

The UE and the network may further follow related provisions of the protocol, and respectively perform PDCCH monitoring or resource allocation according to the quantity N of slots or the set {Ni} of the quantity of slots predefined in the protocol.

It may be understood that in a case of no conflict, the quantity N of slots or the set {Ni} of the quantity of slots may further be determined through a combination of the foregoing methods. For example, the maximum value or the minimum value in manner 2 and manner 3 may be combined to determine the quantity N of slots or the set {Ni} of the quantity of slots.

The method for processing a PDCCH monitoring capability provided in the embodiments of this application improves feasibility of PDCCH monitoring because a value or a value set of the quantity of slots may be determined in the foregoing various manners.

In an embodiment, the position of the slot group may be determined by one of the following manners:

manner 1: determining by any continuous N slots; and after determining the quantity N of slots of the slot group or the set {Ni} of the quantity of slots, the position of the slot group may be determined based on the determined quantity N of slots.

Figure 4:
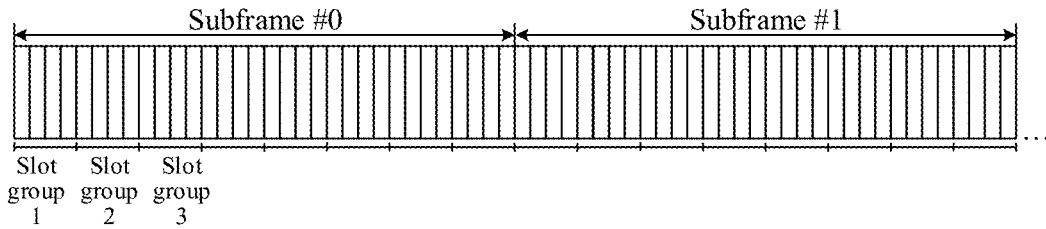
FIG. 4 is a schematic diagram 2 of a position of a slot group according to an embodiment of this application.

In manner I, the position of the slot group may be any continuous N slots. As shown in FIG. 4, when the quantity of slots is 4, the position of the slot group may be any continuous 4 slots in subframes: a subframe #0 and a subframe #1, such as a slot group 1, a slot group 2, and a slot group 3 in FIG. 3.

Manner II: on the radio frame, the radio subframe, or slot bundling (slot bundling), every N slots starting from a first slot are the slot group, a last group uses a last slot of the radio frame, the radio subframe, or the slot bundling as an end slot, and a pattern of the slot group is repeated in each radio frame or radio subframe, where the slot bundling is a unit with a plurality of continuous slots, and the quantity of slots included in the slot bundling is greater than or equal to the quantity of slots included in the slot group.

Manner III: using a slot configured by a network or reported by the UE as a starting slot or a reference slot, and determining the position of the slot group according to the starting slot or the reference slot, and the quantity N of slots; and in manner III, the slot configured by the network or reported by the UE to the network may be used as the starting slot or the reference slot, and starting from the starting slot or the reference slot, every N continuous or discontinuous slots may be used as the position of the slot group.

The reference slot may further be used as a reference point, and starting from a top preset quantity of slots or a last preset quantity of slots of the reference slot, every N continuous or discontinuous slots may be used as the position of the slot group. For example, starting from a slot that is spaced by two slots from the reference slot, that is, every four continuous slots starting from the third slot after the reference slot may be used as the position of the slot group.

As shown in FIG. 4, a first slot #0 in the subframe #0 may be used as a starting slot, and every four continuous slots starting from slot #0 are a slot group, for example, a slot group 1, a slot group 2, a slot group 3, or the like.

Figure 5:
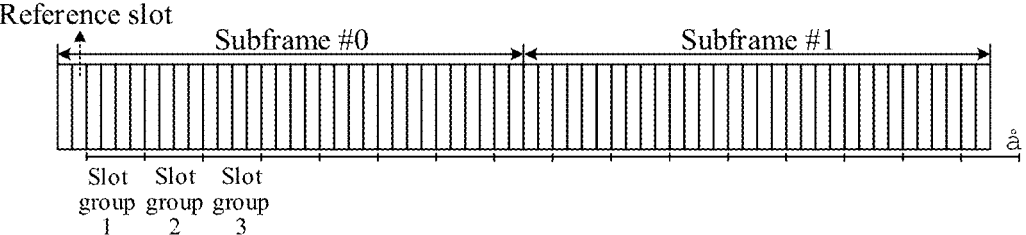
FIG. 5 is a schematic diagram 3 of a position of a slot group according to an embodiment of this application.

As shown in FIG. 5, a slot in the subframe #0 may further be used as a reference slot (Reference slot), and every four continuous slots starting from the reference slot are a slot group, for example, a slot group 1, a slot group 2, a slot group 3, or the like.

Manner IV: determining a pattern of the slot group according to a monitoring occasion configured by search space SS.

The position of the slot group may further be determined according to the monitoring occasion configured by the SS, in combination with the quantity N of slots of the slot group. After the position of the slot group is determined, the pattern of the slot group in the radio frame, the radio subframe, or the slot bundling may be determined according to the position of each slot group.

The method for processing a PDCCH monitoring capability provided in the embodiments of this application may further improve the feasibility of PDCCH monitoring by determining the position of the slot group in the foregoing various ways.

In an embodiment, the determining a pattern of the slot group according to a monitoring occasion configured by SS may include:

determining that the pattern of the slot group is repeated in each radio frame, radio subframe, or slot bundling, where a starting point of a first slot group is a first slot with a monitoring occasion in the radio frame, the radio subframe, or the slot bundling, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, where a last slot group ends at an end point of the radio frame, the radio subframe, or the slot bundling.

Figure 6:
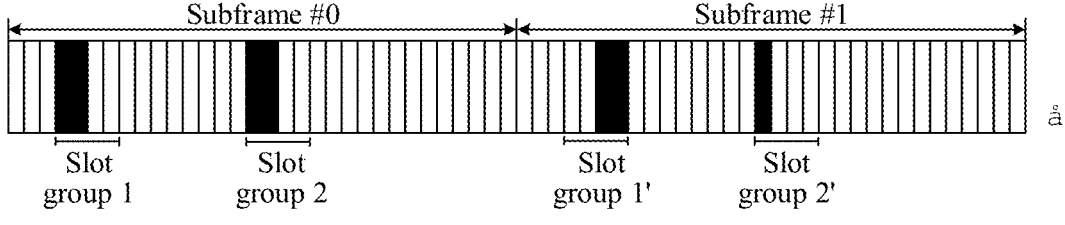
FIG. 6 is a schematic diagram 1 of a pattern of a slot group according to an embodiment of this application.

As shown in FIG. 6, a dark color represents the monitoring occasion. The slot group 1 is the first slot group in the subframe #0, the starting slot of the slot group 1 is the first slot (the 4th slot) with a monitoring occasion in the subframe #0, and the four slots starting from the slot form the slot group 1; and the slot group 2 is the second slot group in the subframe #0, the starting slot of the slot group 2 is the first slot (the 16th slot) with a monitoring occasion that is not in the slot group 1, and the four slots starting from the slot form the slot group 2.

Because the pattern of the slot group is repeated in each radio frame, radio subframe, or slot bundling, the pattern of the slot group in the subframe #1 needs to be consistent with the pattern of the slot group in the subframe #0. That is, a starting point of the slot group 1' is the 4th slot in the subframe #1, and the four slot groups starting from the slot form the slot group 1'; and a starting point of the slot group 2' is the 16th slot in the subframe #1, and the four slot groups starting from the slot form the slot group 2'.

In an embodiment, the determining a pattern of the slot group according to a monitoring occasion configured by SS may include:

determining that the pattern of the slot group is different in each radio frame or radio subframe, where for each radio frame, radio subframe, or slot bundling, a starting point of a first slot group is a first slot with a monitoring occasion in the radio frame, the radio subframe, or the slot bundling, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, where a last slot group ends at the radio frame, the radio subframe, or the slot bundling.

Figure 7:
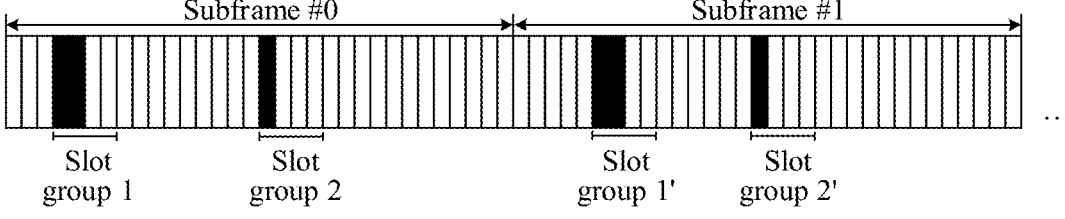
FIG. 7 is a schematic diagram 2 of a pattern of a slot group according to an embodiment of this application.

As shown in FIG. 7, a dark color represents the monitoring occasion. The slot group 1 is the first slot group in the subframe #0, the starting point of the slot group 1 is the first slot with a monitoring occasion in the subframe #0, and the four slots starting from the slot form the slot group 1; and the slot group 2 is the second slot group in the subframe #0, the starting point of the slot group 2 is the first slot with a monitoring occasion that is not in the slot group 1, and the four slots starting from the slot form the slot group 2.

The slot group 3 is the first slot group in the subframe #1, the starting point of the slot group 3 is the first slot with a monitoring occasion in the subframe #1, and the four slots starting from the slot form the slot group 1; and The slot group 4 is the second slot group in the subframe #1, the starting point of the slot group 4 is the first slot with a monitoring occasion that is not in the slot group 3, and the four slots starting from the slot form the slot group 2.

It may be learnt from FIG. 7 that in the subframe #0, the slot group 1 starts from the 4th slot, and the slot group 2 starts from the 16th slot; and in the subframe #1, the slot group 3 starts from the 6th slot, and the slot group 4 starts from the 16th slot. Therefore, patterns of the slot group are different in the radio subframe: the subframe #0 and the subframe #1.

In an embodiment, the determining a pattern of the slot group according to a monitoring occasion configured by SS may include:

using the slot configured by the network or reported by the UE as the starting slot or the reference slot, and determining the pattern of the slot group from the starting slot, or determining the pattern of the slot group from the starting slot spaced from the reference slot by a preset quantity of slots, where a starting point of a first slot group is a first slot with a monitoring occasion after the starting slot or a starting point slot, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, to determine the pattern of the slot group.

It may be understood that in this embodiment, different from the embodiment shown in FIG. 7, the starting point of the first slot group depends on the slot configured by the network or reported by the UE. After the starting point of the first slot group is determined, a specific manner of forming subsequent slot groups may be the same as that in the embodiment shown in FIG. 7, which will not be repeated herein.

It is to be noted that in this embodiment, the pattern of the slot group may be the same in each radio frame, radio subframe, or slot bundling, or may be different in each radio frame, radio subframe, or slot bundling, which is not specifically limited in the embodiments of this application.

In an embodiment, the slot group meets one or more of the following conditions:

condition 1: a distance between slot groups is greater than or equal to a first predetermined value; and A specific size of the first predetermined value may be, for example, five slots, six slots, or the like, and the specific size of the first predetermined value may be adjusted according to actual needs, which is not specifically limited in the embodiments of this application.

Condition 2: a quantity of search space SS sets configured in each slot group is less than or equal to a second predetermined value, where the condition is limited before search space SS dropping; and a specific size of the second predetermined value may be, for example, 2, 3, or the like, and the specific size of the second predetermined value may be adjusted according to actual needs, which is not specifically limited in the embodiments of this application.

Condition 3: a quantity of BDs or CCEs in each slot group is less than or equal to a third predetermined value; and a specific size of the third predetermined value may be, for example, 8, 10, or the like, and the specific size of the third predetermined value may be adjusted according to actual needs, which is not specifically limited in the embodiments of this application.

Condition 4: a quantity of monitoring occasions for each slot group is less than or equal to a fourth predetermined value, where the condition is before SS dropping; and a specific size of the fourth predetermined value may be, for example, ten, twelve, or the like, and the specific size of the fourth predetermined value may be adjusted according to actual needs, which is not specifically limited in the embodiments of this application.

Condition 5: a quantity of monitoring occasions for each slot in each slot group is less than or equal to a fifth predetermined value, where the condition is before SS dropping.

A specific size of the fifth predetermined value may be, for example, 4, 6, or the like, and the specific size of the fifth predetermined value may be adjusted according to actual needs, which is not specifically limited in the embodiments of this application.

The method for processing the PDCCH monitoring capability provided in the embodiments of this application may ensure a smooth progress of the PDCCH monitoring based on the slot group by causing the slot group to meet one or a combination of the restriction conditions.

In an embodiment, the PDCCH monitoring capability further includes any one or a combination of the following:

capability 1: for a scheduled secondary cell Scell, corresponding to each bandwidth part BWP, there are at most a first preset quantity of search space SS sets on a slot monitorable by each radio frame, radio subframe, or slot group, and the restriction is before search space SS dropping is performed, where a specific size of the first preset quantity may be, for example, 2, 3, or the like, and the specific size of the first preset quantity may be adjusted according to actual needs, which is not specifically limited in the embodiments of this application.

Capability 2: for a frequency division duplex FDD system, and for each scheduled carrier component CC, only a second preset quantity of pieces of downlink control information DCI for scheduling downlink DL unicast transmission and a third preset quantity of pieces of DCI for scheduling uplink UL unicast transmission are processed on a minotorable slot of each radio frame, radio subframe, or slot group, where a specific size of the second preset quantity and a specific size of the third preset quantity may be, for example, 1, 2, or the like, and the specific size of the second preset quantity and the specific size of the third preset quantity may be adjusted according to actual needs, which is not specifically limited in the embodiments of this application.

Capability 3: for a time division duplex TDD system, and for each scheduled CC, only a fourth preset quantity of pieces of downlink control information DCI for scheduling downlink DL unicast transmission and a fifth preset quantity of pieces of DCI for scheduling uplink UL unicast transmission are processed on a minotorable slot of each radio frame, radio subframe, or slot group.

A specific size of the fourth preset quantity and a specific size of the fifth preset quantity may be, for example, 1, 2, or the like, and a specific size of the fourth preset quantity and the specific size of the fifth preset quantity may be adjusted according to actual needs, which is not specifically limited in the embodiments of this application.

It may be understood that in some cases, the first preset quantity, second preset quantity, third preset quantity, fourth preset quantity, and fifth preset quantity may further be the same value, or a plurality of first preset quantity, second preset quantity, third preset quantity, fourth preset quantity, and fifth preset quantity may be the same value.

The method for processing a PDCCH monitoring capability provided in the embodiments of this application further subdivides the PDCCH monitoring capability according to different use scenarios or working environments, which may improve adaptability of PDCCH monitoring and effectively expand an application range of PDCCH monitoring.

In an embodiment, the PDCCH monitoring capability may further include one or more of the following:

capability a: time at which the UE demodulates specific DCI, where the specific DCI may be DCI that causes a PDCCH to schedule a plurality of PDSCHs.

Capability b: a minimum K0 or K2 restriction; and capability c: earliest time at which the UE performs physical downlink shared channel PDSCH buffer.

The method for processing a PDCCH monitoring capability provided in the embodiments of this application may ensure that appropriate resources are configured for the UE through related parameters of service processing with the UE as a part of the PDCCH monitoring capability, thereby avoiding the failure of PDCCH monitoring due to an insufficient UE capability.

In an embodiment, the method for processing a PDCCH monitoring capability provided in the embodiments of this application is applied to a specific frequency and/or a subcarrier spacing SCS.

In an embodiment, the method for processing a PDCCH monitoring capability provided in the embodiments of this application is applied to UE supporting a Redcap capability.

In an embodiment, the method for processing a PDCCH monitoring capability provided in the embodiments of this application may further include:

in a case that the UE simultaneously supports a Rel-15/16 PDCCH monitoring capability and a Rel-17 PDCCH monitoring capability, and when the network configures the UE to support a Rel-17 capability, performing one of the following methods:

disabling the Rel-15/16 PDCCH monitoring capability; or enabling the Rel-15/16 PDCCH monitoring capability only on a slot monitorable and defined by Rel-17.

In an embodiment, step S220 may include: sending the PDCCH monitoring capability through per band (per band), or per band combination (per band combination), or per feature set (per feature set).

In an embodiment, the PDCCH monitoring capability is only supported when the UE reports supporting a multi-physical downlink shared channel/physical uplink shared channel multi-PDSCH/PUSCH capability.

In an embodiment, the PDCCH monitoring capability is mandatory or is mandatory at a preset frequency and/or a preset subcarrier spacing SCS; or the PDCCH monitoring capability is optional or is optional at a preset frequency and/or a preset subcarrier spacing SCS.

The following uses a specific example to describe the method for processing a PDCCH monitoring capability provided in the embodiments of this application:

Example 1

The PDCCH is configured in the active (active) BWP of the serving cell of 52.6 to 71 GHz. When the SCS of the active BWP is 480/960 KHz, the UE applies the following mandatory PDCCH monitoring capabilities:

for Type 0, Type 0A, and Type 2 CSS and Type 1 with non-dedicated RRC configuration, the monitoring occasion may be on any slot; and for Type 1 with dedicated RRC configuration, Type 3, and USS, the monitoring occasion may be on the slots spaced by the preset quantity of slots in a subframe, where the quantity of preset slots is four for the SCS of 480 KHz and eight for the SCS of 960 KHz.

For a scheduled Scell, and for each BWP, there are at most L=three SS sets on each monitorable slot, and the restriction is before performing SS dropping;

for an FDD system, and for each scheduled CC, only DCI transmitted by one scheduling DL unicast and DCI transmitted by one scheduling UL unicast are processed on each monitorable slot; and for a TDD system, and for each scheduled CC, only DCI transmitted by one scheduling DL unicast and DCI transmitted by two scheduling UL unicasts are processed on each monitorable slot.

Example 2

The PDCCH is configured in the active BWP of the serving cell of 52.6 to 71 GHz. When the SCS of the active BWP is 480/960 KHz, the UE applies the following optional PDCCH monitoring capabilities:

for Type 1 with dedicated RRC configuration, Type 3, and USS, the monitoring occasion may be on any slot; and for Type 1 with dedicated RRC configuration, Type 3, and USS, the monitoring occasion may be on any slot in a subframe, and any continuous PDCCHs meet a specific gap value, that is, spaced by g slots, where g is four for the SCS of 480 KHz and eight for the SCS of 960 KHz.

Figure 8:
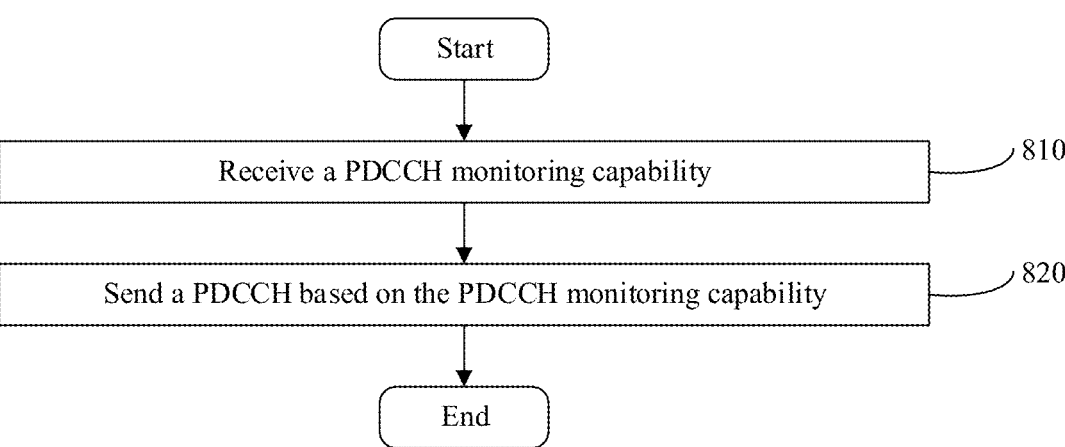
FIG. 8 is a schematic flowchart 2 of a method for processing a PDCCH monitoring capability according to an embodiment of this application.

FIG. 8 is a schematic flowchart 2 of a method for processing a PDCCH monitoring capability according to an embodiment of this application. As shown in FIG. 8, the embodiments of this application further provide a method for processing a PDCCH monitoring capability. The method is applied to a network-side device, and may include:

S810. Receive the PDCCH monitoring capability; and

S820. Send a PDCCH based on the PDCCH monitoring capability, where the PDCCH monitoring capability includes any one or a combination of the following:

a monitoring occasion is only on a predetermined slot of a radio frame, a radio subframe, or a slot group; or a monitoring occasion is on any slot of a radio frame, a radio subframe, or a slot group.

It is to be noted that an execution entity of the method may be a network-side device. The technical solutions of this application will be described in detail below by using the network-side device performing the method as an example.

First, the UE may determine the PDCCH monitoring capability, that is, determine a restriction condition that needs to be met by the slot monitorable by the UE.

After determining the PDCCH monitoring capability, the UE may send the PDCCH monitoring capability to the network-side device.

The network-side device receives the PDCCH monitoring capability sent by the UE, and configures a corresponding resource for the UE according to the PDCCH monitoring capability, such as configuring a corresponding PDCCH for the UE.

After configuring the PDCCH, the network-side device sends the PDCCH to the UE, so that the UE performs monitoring on the PDCCH.

In an embodiment, in a first preset case, the monitoring occasion is only on the predetermined slot of the radio frame, the radio subframe, or the slot group; and in a second preset case, the monitoring occasion is on any slot of the radio frame, the radio subframe, or the slot group.

The first preset case may be a condition for all search space or a condition for Type 1 with dedicated radio resource control RRC configuration, Type 3, and user-specific search space USS.

The second preset case may be a condition for all search space or a condition for Type 0, Type 0A, Type 2 common search space CSS, and Type 1 with non-dedicated RRC configuration.

In the first preset case, the monitoring occasion (the occasion at which the UE performs PDCCH monitoring) may be only on the predetermined slot of the radio frame, the radio subframe, or the slot group. That is, in the first preset case, the UE may perform monitoring on the PDCCH on the predetermined slot.

In the second preset case, the monitoring occasion may be on any slot of the radio frame, the radio subframe, or the slot group. That is, in the second preset case, the UE may perform monitoring on the PDCCH on any slot of the radio frame, the radio subframe, or the slot group.

The apparatus for processing a PDCCH monitoring capability provided in the embodiments of this application determine to perform monitoring on the PDCCH on the predetermined slot or any slot of the radio frame, the radio subframe, or the slot group for different conditions. Compared with the related art in which the PDCCH monitoring capability is mechanically defined according to granularity of per slot or per span, complexity of PDCCH monitoring implemented by the UE may be effectively reduced, thereby significantly improving communication efficiency and reducing energy consumption of the UE, and there are very broad application prospects.

In an embodiment, in case of a first preset case, the predetermined slot includes any one of the following:

a top preset quantity of slots in the radio frame, the radio subframe, or the slot group;

a last preset quantity of slots of the radio frame, the radio subframe, or the slot group; or slots spaced by a preset quantity of slots in the radio frame, the radio subframe, or the slot group.

The preset quantity may be, for example, 2, 3, or the like, and a specific size may be adjusted according to actual needs, which is not specifically limited in the embodiments of this application.

When the preset quantity is 2, the predetermined slots may be the first 2 or last 2 slots of the radio frame, the first 2 or last 2 slots of the radio subframe, or the first 2 or last 2 slots of the slot group.

The preset quantity of slots may be, for example, 4, 5, or the like, and a specific size may be adjusted according to actual needs, which is not specifically limited in the embodiments of this application.

When the preset quantity of slots is 4, the predetermined slot may be a slot every 4 slots in the radio frame. For example, when the first predetermined slot is the second slot of the radio frame, the subsequent predetermined slot (the second predetermined slot, the third predetermined slot, or the like) may be the 7th slot, the 12th slot, or the like of the radio frame; the predetermined slot may further be a slot every 4 slots in the radio subframe. For example, when the first predetermined slot is the second slot of the radio subframe, the subsequent predetermined slot (the second predetermined slot, the third predetermined slot, or the like) may be the 7th slot, the 12th slot, or the like of the radio subframe; and the predetermined slot may further be a slot every 4 slots in the slot group. For example, when the first predetermined slot is the second slot of the slot group, the subsequent predetermined slot (the second predetermined slot, the third predetermined slot, or the like) may be the 7th slot, the 12th slot, or the like of the slot group.

The apparatus for processing a PDCCH monitoring capability provided in the embodiments of this application improves flexibility of PDCCH monitoring because the predetermined slot may be on a plurality of slots of the radio frame, the radio subframe, or the slot group.

In an embodiment, the method for processing a PDCCH monitoring capability provided in the embodiments of this application may further include:

configuring SS on a slot monitorable by UE based on the PDCCH monitoring capability.

It is to be noted that after receiving the PDCCH monitoring capability, the network-side device may determine on which slots the UE performs monitoring on the PDCCH. Therefore, after receiving the PDCCH monitoring capability, the network-side device configures the SS for the UE on the slot monitorable by the UE, so that the UE performs monitoring on the PDCCH.

It is to be noted that in the method for processing a PDCCH monitoring capability provided in the embodiments of this application, an execution entity may be an apparatus for processing a PDCCH monitoring capability, or a control module configured to perform the method for processing a PDCCH monitoring capability in the apparatus for processing a PDCCH monitoring capability. In the embodiments of this application, an example in which the apparatus for processing a PDCCH monitoring capability performs the method for processing a PDCCH monitoring capability is used, to describe the apparatus for processing a PDCCH monitoring capability provided in the embodiments of this application.

Figures 9, 10, 11:
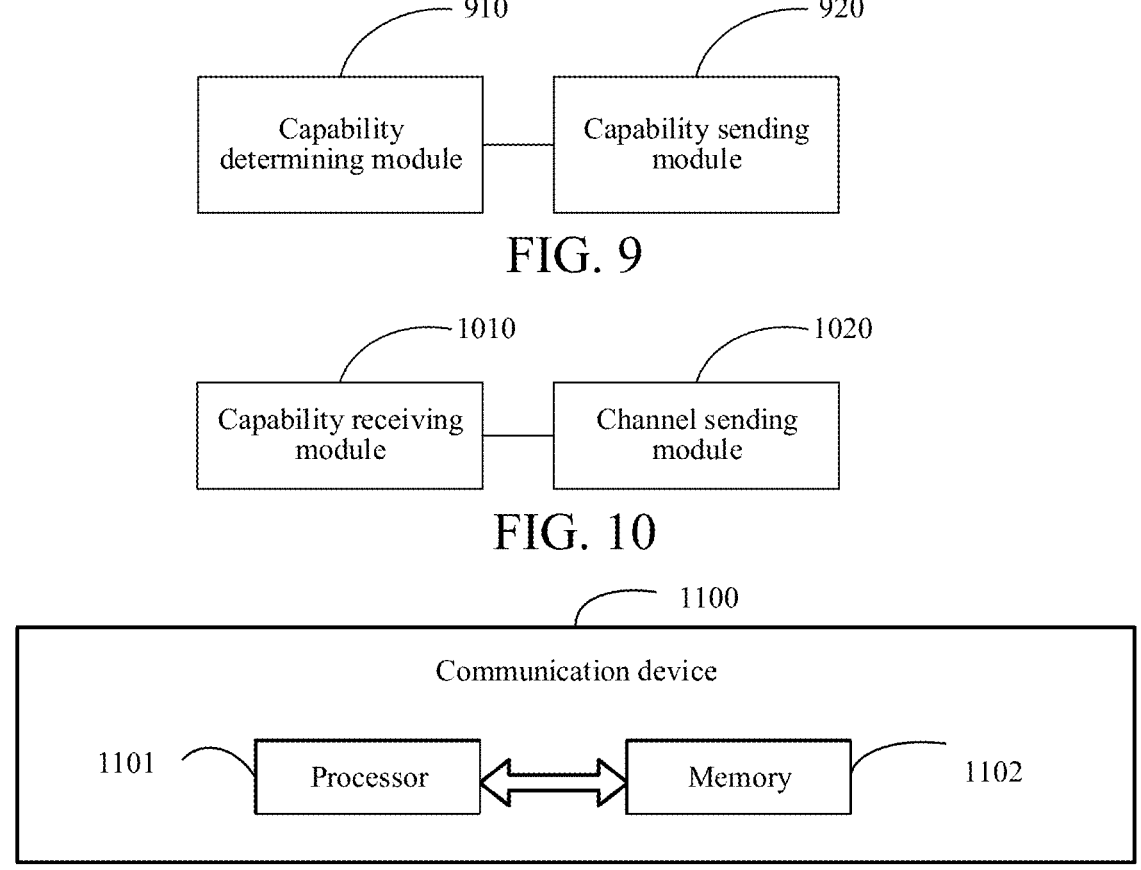
FIG. 9 is a schematic structural diagram 1 of an apparatus for processing a PDCCH monitoring capability according to an embodiment of this application.
FIG. 10 is a schematic structural diagram 2 of an apparatus for processing a PDCCH monitoring capability according to an embodiment of this application.
FIG. 11 is a schematic structural diagram of a communication device implementing an embodiment of this application.

FIG. 9 is a schematic structural diagram 1 of an apparatus for processing a PDCCH monitoring capability according to an embodiment of this application. As shown in FIG. 9, the embodiments of this application provide an apparatus for processing a PDCCH monitoring capability. The apparatus is applied to a terminal, and may include:

a capability determining module 910, configured to determine a physical downlink control channel PDCCH monitoring capability, where the PDCCH monitoring capability represents a restriction condition that needs to be met by a slot monitorable by the terminal (e.g., UE); and a capability sending module 920, configured to send the PDCCH monitoring capability, where PDCCH monitoring capability includes any one or a combination of the following:

a monitoring occasion is only on a predetermined slot of a radio frame, a radio subframe, or a slot group; or a monitoring occasion is on any slot of a radio frame, a radio subframe, or a slot group.

The apparatus for processing a PDCCH monitoring capability provided in the embodiments of this application determine to perform monitoring on the PDCCH on the predetermined slot or any slot of the radio frame, the radio subframe, or the slot group for different conditions. Compared with the related art in which the PDCCH monitoring capability is mechanically defined according to granularity of per slot or per span, complexity of PDCCH monitoring implemented by the UE may be effectively reduced, thereby significantly improving communication efficiency and reducing energy consumption of the UE, and there are very broad application prospects.

Optionally, the predetermined slot may include any one of the following:

a top preset quantity of slots in the radio frame, the radio subframe, or the slot group;

a last preset quantity of slots of the radio frame, the radio subframe, or the slot group; or slots spaced by a preset quantity of slots in the radio frame, the radio subframe, or the slot group.

Optionally, in a first preset case, the monitoring occasion is only on the predetermined slot of the radio frame, the radio subframe, or the slot group; and in a second preset case, the monitoring occasion is on any slot of the radio frame, the radio subframe, or the slot group, where the first preset case is a condition for all search space or a condition for Type 1 with dedicated radio resource control RRC configuration, Type 3, and user-specific search space USS; and the second preset case is a condition for all search space or a condition for Type 0, Type 0A, Type 2 common search space CSS, and Type 1 with non-dedicated RRC configuration.

Optionally, the PDCCH monitoring capability further may include any one of the following:

in a first preset case, the monitoring occasion is on any slot of the radio frame, the radio subframe, or the slot group; or in a first preset case, the monitoring occasion is on any slot of the radio frame, the radio subframe, or the slot group, and any continuous PDCCHs meet a preset gap.

Optionally, the slot group may be determined in the following manners:

determining a quantity N of slots or a set $\{Ni\}$ of a quantity of slots included in the slot group; and determining a position of the slot group based on the determined quantity N of slots or the set $\{Ni\}$ of the quantity of slots.

Optionally, the quantity N of slots or the set $\{Ni\}$ of the quantity of slots is obtained through one of the following manners:

obtaining the quantity N of slots through a quantity of slots configured by a network, or obtaining the set $\{Ni\}$ of the quantity of slots through a quantity of slots configured by a network;

obtaining through a quantity of a plurality of physical downlink shared channels PDSCHs or a quantity of slots that are schedulable by a scheduling parameter configured by a network in downlink control information DCI time domain;

obtaining through a capability parameter reported by the terminal (e.g., UE), where the capability parameter includes the quantity N of slots or the set $\{Ni\}$ of the quantity of slots, or includes a quantity of a plurality of PDSCHs or a quantity of slots that are schedulable by a time domain scheduling parameter in DCI; or obtaining through the quantity N of slots or the set $\{Ni\}$ of the quantity of slots predefined in a protocol.

Optionally, the position of the slot group may be determined by one of the following manners:

determining by any continuous N slots, where on the radio frame or the radio subframe or slot bundling, every N slots starting from a first slot are the slot group, a last group uses a last slot of the radio frame, the radio subframe, or the slot bundling as an end slot, and a pattern of the slot group is repeated in each radio frame, radio subframe, or slot bundling;

using a slot configured by a network or reported by the UE as a starting slot or a reference slot, and determining the position of the slot group according to the starting slot or the reference slot, and the quantity N of slots; or determining a pattern of the slot group according to a monitoring occasion configured by search space SS.

Optionally, the determining a pattern of the slot group according to a monitoring occasion configured by search space SS may include:

determining that the pattern of the slot group is repeated in each radio frame, radio subframe, or slot bundling, where a starting point of a first slot group is a first slot with a monitoring occasion in the radio frame, the radio subframe, or the slot bundling, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, where a last slot group ends at an end point of the radio frame, the radio subframe, or the slot bundling.

Optionally, the determining a pattern of the slot group according to a monitoring occasion configured by search space SS may include:

determining that the pattern of the slot group is different in each radio frame, radio subframe, or slot bundling, where a starting point of a first slot group is a first slot with a monitoring occasion in the radio frame, the radio subframe, or the slot bundling, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, where a last slot group ends at the radio frame, the radio subframe, or the slot bundling.

Optionally, the determining a pattern of the slot group according to a monitoring occasion configured by search space SS may include:

using the slot configured by the network or reported by the UE as the starting slot or the reference slot, and determining the pattern of the slot group from the starting slot, or determining the pattern of the slot group from the starting slot spaced from the reference slot by a preset quantity of slots, where a starting point of a first slot group is a first slot with a monitoring occasion after the starting slot or a starting point slot, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, to determine the pattern of the slot group.

Optionally, the capability parameter may further include one or more of the following parameters:

the quantity of slots included in the slot group;

a gap value between slots or slot groups; or a blind detection BD budget value or a control channel element CCE budget value.

Optionally, the slot group may meet one or more of the following conditions:

a distance between slot groups is greater than or equal to a first predetermined value;

a quantity of search space SS sets configured in each slot group is less than or equal to a second predetermined value, where the condition is limited before search space SS dropping; and a quantity of blind detections BDs/control channel elements CCEs in each slot group is less than or equal to a third predetermined value;

a quantity of monitoring occasions for each slot group is less than or equal to a fourth predetermined value, where the condition is before SS dropping; or a quantity of monitoring occasions for each slot in each slot group is less than or equal to a fifth predetermined value, where the condition is before SS dropping.

Optionally, the PDCCH monitoring capability further may include any one or a combination of the following:

for a scheduled secondary cell Scell, corresponding to each bandwidth part BWP, there are at most a first preset quantity of search space SS sets on a slot monitorable by each radio frame, radio subframe, or slot group, and the restriction is before performing SS dropping;

for a frequency division duplex FDD system, and for each scheduled carrier component CC, only a second preset quantity of pieces of downlink control information DCI for scheduling downlink DL unicast transmission and a third preset quantity of pieces of DCI for scheduling uplink UL unicast transmission are processed on a minotorable slot of each radio frame, radio subframe, or slot group; or for a time division duplex TDD system, and for each scheduled CC, only a fourth preset quantity of pieces of downlink control information DCI for scheduling downlink DL unicast transmission and a fifth preset quantity of pieces of DCI for scheduling uplink UL unicast transmission are processed on a minotorable slot of each radio frame, radio subframe, or slot group.

Optionally, the PDCCH monitoring capability may further include one or more of the following:

time at which the UE demodulates specific DCI;

a minimum K0 or K2 restriction; or earliest time at which the UE performs physical downlink shared channel PDSCH buffer.

Optionally, the apparatus for processing a PDCCH monitoring capability provided in the embodiments of the present invention is applied to a specific frequency and/or a subcarrier spacing SCS.

Optionally, the apparatus for processing a PDCCH monitoring capability provided in the embodiments of the present invention is applied to UE supporting a Redcap capability.

Optionally, the apparatus for processing a PDCCH monitoring capability provided in the embodiments of the present invention may further include an effective module (not shown in the figure), configured to:

in a case that the UE simultaneously supports a Rel-15/16 PDCCH monitoring capability and a Rel-17 PDCCH monitoring capability, and when the network configures the UE to support a Rel-17 capability, perform one of the following methods:

disabling the Rel-15/16 PDCCH monitoring capability; or enabling the Rel-15/16 PDCCH monitoring capability only on a slot monitorable and defined by Rel-17.

Optionally, the capability sending module 820 may be further configured to:

send the PDCCH monitoring capability through per band, per band combination, or per feature set.

Optionally, the PDCCH monitoring capability is only supported when the UE reports supporting a multi-PDSCH/PUSCH capability.

Optionally, the PDCCH monitoring capability is mandatory or is mandatory at a preset frequency and/or a preset subcarrier spacing SCS; or the PDCCH monitoring capability is optional or is optional at a preset frequency and/or a preset subcarrier spacing SCS.

The apparatus for processing a PDCCH monitoring capability in the embodiments of this application may be an apparatus, and may also be a component in a terminal, an integrated circuit, or a chip. The apparatus may be a mobile terminal, or may be a non-mobile terminal. For example, the mobile terminal may include, but is not limited to, Type of the terminal 11 listed above, and a non-mobile terminal may be a server, a network attached storage (Network Attached Storage, NAS), a personal computer (personal computer, PC), a television (television, TV), a cash machine, a self-service machine, or the like, which is not specifically limited in this embodiment of this application.

The apparatus for processing a PDCCH monitoring capability in the embodiments of this application may be an apparatus having an operating system. The operating system may be an Android (Android) operating system, may be an ios operating system, and may further be another possible operating system, which is not specifically limited in this embodiment of this application.

The apparatus for processing a PDCCH monitoring capability provided in the embodiments of this application may implement various processes of the method embodiments in FIG. 2 to FIG. 7, and implement the same technical effect, which will not be described in detail herein again to avoid repetition.

FIG. 10 is a schematic structural diagram 2 of an apparatus for processing a PDCCH monitoring capability according to an embodiment of this application. As shown in FIG. 10, the embodiments of this application provide an apparatus for processing a PDCCH monitoring capability. The apparatus is applied to a network-side device, and may include:

a capability receiving module 1010, configured to receive the PDCCH monitoring capability; and a channel sending module 1020, configured to send a PDCCH based on the PDCCH monitoring capability, where the PDCCH monitoring capability includes any one or a combination of the following:

a monitoring occasion is only on a predetermined slot of a radio frame, a radio subframe, or a slot group; or a monitoring occasion is on any slot of a radio frame, a radio subframe, or a slot group.

The apparatus for processing a PDCCH monitoring capability provided in the embodiments of this application determine to perform monitoring on the PDCCH on the predetermined slot or any slot of the radio frame, the radio subframe, or the slot group for different conditions. Compared with the related art in which the PDCCH monitoring capability is mechanically defined according to granularity of per slot or per span, complexity of PDCCH monitoring implemented by the UE may be effectively reduced, thereby significantly improving communication efficiency and reducing energy consumption of the UE, and there are very broad application prospects.

Optionally, the predetermined slot may include any one of the following:

a top preset quantity of slots in the radio frame, the radio subframe, or the slot group;

a last preset quantity of slots of the radio frame, the radio subframe, or the slot group; or slots spaced by a preset quantity of slots in the radio frame, the radio subframe, or the slot group.

Optionally, the apparatus for processing a PDCCH monitoring capability provided in the embodiments of this application may further include a capability configuration module (not shown in the figure), configured to:

configure search space SS on a slot monitorable by a terminal (e.g., UE) based on the PDCCH monitoring capability.

The apparatus for processing a PDCCH monitoring capability in the embodiments of this application may be an apparatus, and may also be a component in a terminal, an integrated circuit, or a chip. The apparatus may be a mobile terminal, or may be a non-mobile terminal. For example, the mobile terminal may include, but is not limited to, Type of the terminal 11 listed above, and a non-mobile terminal may be a server, a network attached storage (Network Attached Storage, NAS), a personal computer (personal computer, PC), a television (television, TV), a cash machine, a self-service machine, or the like, which is not specifically limited in this embodiment of this application.

The apparatus for processing a PDCCH monitoring capability in the embodiments of this application may be an apparatus having an operating system. The operating system may be an Android (Android) operating system, may be an ios operating system, and may further be another possible operating system, which is not specifically limited in this embodiment of this application.

The apparatus for processing a PDCCH monitoring capability provided in the embodiments of this application may implement various processes of the method embodiments in FIG. 3 to FIG. 8, and implement the same technical effect, which will not be described in detail herein again to avoid repetition.

Optionally, as shown in FIG. 11, the embodiments of this application further provide a communication device 1100, including a processor 1101, a memory 1102, and a program or an instruction stored in the memory 1102 and executable on the processor 1101. For example, when the communication device 1100 is a terminal, the program or instruction, when executed by the processor 1101, implements various processes of the embodiment of the method for processing a PDCCH monitoring capability, and may implement the same technical effect. When the communication device 1100 is a network-side device, various processes of the embodiment of the method for processing a PDCCH monitoring capability is implemented when the program or instruction is executed by the processor 1101, and implement the same technical effect, which will not be described in detail herein again to avoid repetition.

Figure 12:
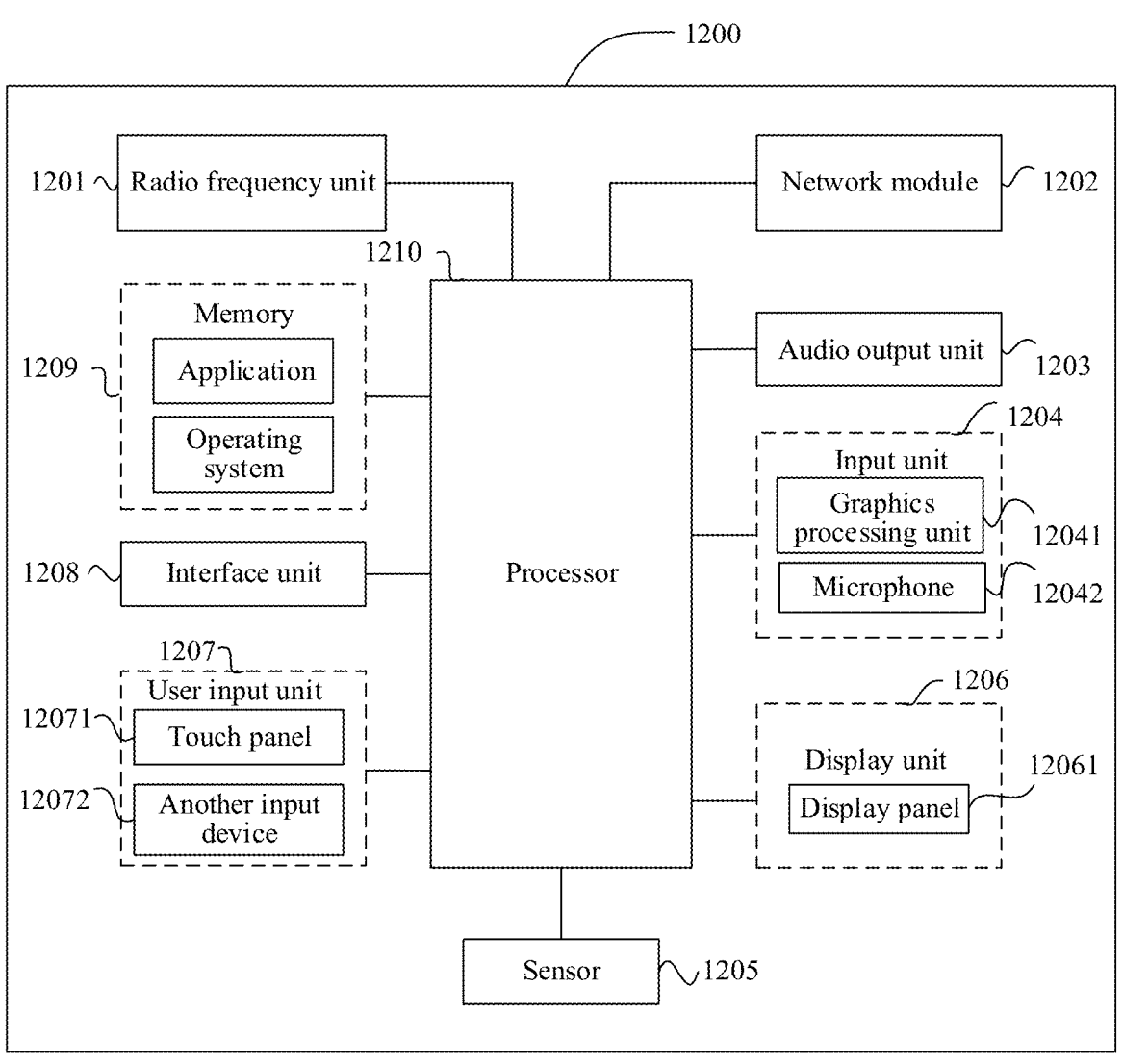
FIG. 12 is a schematic diagram of a hardware structure of a terminal according to an embodiment of this application.

FIG. 12 is a schematic diagram of a hardware structure of a terminal according to an embodiment of this application.

The terminal 1200 includes, but is not limited to, components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

A person skilled in the art may understand that the terminal 1200 may further include the power supply (such as a battery) for supplying power to the components. The power supply may be logically connected to the processor 1210 by a power management system, thereby implementing functions such as charging, discharging, and power consumption management by using the power management system. A terminal structure shown in FIG. 12 does not constitute a limitation to the terminal, and the terminal may include more or fewer components than those shown in the figure, or some components may be combined, or a different component deployment may be used, and details are not repeated herein.

It should be understood that, in this embodiment of this application, the input unit 1204 may include a graphics processing unit (Graphics Processing Unit, GPU) 12041 and a microphone 12042. The graphics processing unit 12041 performs processing on image data of a static picture or a video that is obtained by an image acquisition apparatus (for example, a camera) in a video acquisition mode or an image acquisition mode. The display unit 1206 may include a display panel 12061, and the display panel 12061 may be configured by using a liquid crystal display, an organic light-emitting diode, or the like. The user input unit 1207 includes a touch panel 12071 and another input device 12072. The touch panel 12071 is also referred to as a touchscreen. The touch panel 12071 may include two parts: a touch detection apparatus and a touch controller. The another input device 12072 may include, but not limited to, a physical keyboard, a functional key (such as a volume control key or a switch key), a track ball, a mouse, and a joystick, which are not described herein in detail.

In this embodiment of this application, the radio frequency unit 1201 receives downlink data from a network-side device and transmits the downlink data to the processor 1210 for processing; and transmits uplink data to the network-side device. Generally, the radio frequency unit 1201 includes, but is not limited to, an antenna, at least one amplifier, a transceiver, a coupler, a low noise amplifier, a duplexer, and the like.

The memory 1209 may be configured to store a software program or an instruction and various data. The memory 1209 may mainly include a program or an instruction storage area and a data storage area. The program or instruction storage area may store an operating system, an application program or instruction required by at least one function (such as a sound playback function and an image display function), and the like. In addition, the memory 1209 may include a high-speed random access memory, and may further include a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. Such as at least one magnetic disk storage device, a flash memory device, or other non-volatile solid-state storage devices.

The processor 1210 may include one or more processing units. The processor 1210 may integrate an application processor and a modem, where the application processor mainly processes an operating system, a user interface, and an application program or instruction, and the modem mainly processes wireless communication, such as a baseband processor. It may be understood that the foregoing modem may either not be integrated into the processor 1210.

The processor 1210 is configured to determine a physical downlink control channel PDCCH monitoring capability, where the PDCCH monitoring capability represents a restriction condition that needs to be met by a slot monitorable by the terminal (e.g., UE); and a radio frequency unit 1201 is configured to send the PDCCH monitoring capability, where PDCCH monitoring capability includes any one or a combination of the following:

a monitoring occasion is only on a predetermined slot of a radio frame, a radio subframe, or a slot group; or a monitoring occasion is on any slot of a radio frame, a radio subframe, or a slot group.

The terminal provided in the embodiments of this application determine to perform monitoring on the PDCCH on the predetermined slot or any slot of the radio frame, the radio subframe, or the slot group for different conditions. Compared with the related art in which the PDCCH monitoring capability is mechanically defined according to granularity of per slot or per span, complexity of PDCCH monitoring implemented by the UE may be effectively reduced, thereby significantly improving communication efficiency and reducing energy consumption of the UE, and there are very broad application prospects.

Optionally, the processor 1210 is further configured to determine a quantity N of slots or a set {Ni} of a quantity of slots included in the slot group; and determine a position of the slot group based on the determined quantity N of slots or the set {Ni} of the quantity of slots.

Optionally, the processor 1210 is further configured to determine a pattern of the slot group according to a monitoring occasion configured by search space SS, including:

determining that the pattern of the slot group is repeated in each radio frame, radio subframe, or slot bundling, where a starting point of a first slot group is a first slot with a monitoring occasion in the radio frame, the radio subframe, or the slot bundling, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, where a last slot group ends at an end point of the radio frame, the radio subframe, or the slot bundling.

Optionally, the processor 1210 is further configured to determine a pattern of the slot group according to a monitoring occasion configured by search space SS, including:

determining that the pattern of the slot group is different in each radio frame, radio subframe, or slot bundling, where a starting point of a first slot group is a first slot with a monitoring occasion in the radio frame, the radio subframe, or the slot bundling, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, where a last slot group ends at the radio frame, the radio subframe, or the slot bundling.

Optionally, the processor 1210 is further configured to determine a pattern of the slot group according to a monitoring occasion configured by search space SS, including:

using the slot configured by the network or reported by the UE as the starting slot or the reference slot, and determining the pattern of the slot group from the starting slot, or determining the pattern of the slot group from the starting slot spaced from the reference slot by a preset quantity of slots, where a starting point of a first slot group is a first slot with a monitoring occasion after the starting slot or a starting point slot, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, to determine the pattern of the slot group.

Optionally, the processor 1210 is further configured to, in a case that the UE simultaneously supports a Rel-15/16 PDCCH monitoring capability and a Rel-17 PDCCH monitoring capability, and when the UE configured by the network supports a Rel-17 capability, perform one of the following methods:

disabling the Rel-15/16 PDCCH monitoring capability; or enabling the Rel-15/16 PDCCH monitoring capability only on a slot monitorable and defined by Rel-17.

Optionally, a radio frequency unit 1201 is further configured to send the PDCCH monitoring capability through per band, per band combination, or per feature set.

The terminal provided in the embodiments of this application may effectively reduce complexity of implementing PDCCH monitoring by the UE, thereby significantly improving communication efficiency and reducing energy consumption of the UE.

Figure 13:
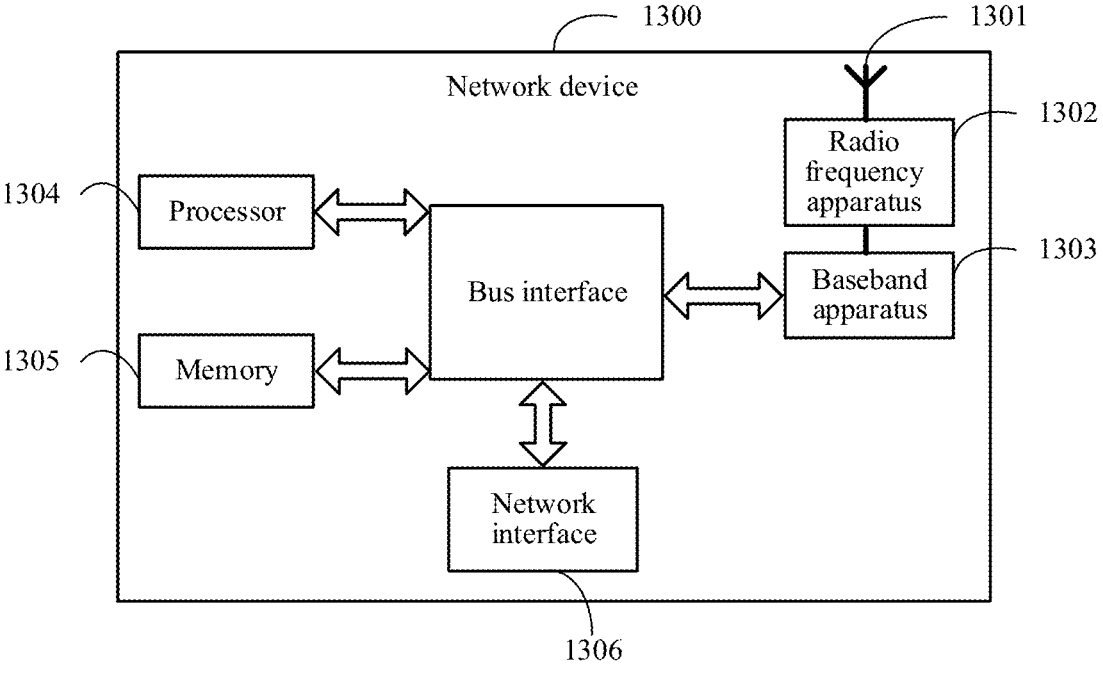
FIG. 13 is a schematic diagram of a hardware structure of a network-side device implementing an embodiment of this application.

The embodiments of this application further provide a network-side device. As shown in FIG. 13, the network device 1300 includes: an antenna 1301, a radio frequency apparatus 1302, and a baseband apparatus 1303. The antenna 1301 is connected to the radio frequency apparatus 1302. In an uplink direction, the radio frequency apparatus 1302 receives information through the antenna 1301, and transmits the received information to the baseband apparatus 1303 for processing. In a downlink direction, the baseband apparatus 1303 performs processing on the to-be-transmitted information, and transmits the to-be-transmitted information to the radio frequency apparatus 1302. After performing processing on the received information, the radio frequency apparatus 1302 transmits the received information out through the antenna 1301.

The frequency band processing apparatus may be located in the baseband apparatus 1303, and the method performed by the network-side device in the foregoing embodiment may be implemented in the baseband apparatus 1303. The baseband apparatus 1303 includes a processor 1304 and a memory 1305.

The baseband apparatus 1303 may include, for example, at least one baseband board, and a plurality of chips are arranged on the baseband board. As shown in FIG. 13, for example, one of the chips is a processor 1304, and is connected to the memory 1305, to invoke the program in the memory 1305, and to perform the network device operation shown in the foregoing method embodiments.

The baseband apparatus 1303 may further include a network interface 1306 used for exchanging information with the radio frequency apparatus 1302. For example, the interface is a common public radio interface (common public radio interface, CPRI).

Alternatively, the network-side device of this embodiment of the present invention further includes: an instruction or a program stored in the memory 1305 and executable on the processor 1304. The processor 1304 invokes the instruction or program in the memory 1305 to perform the method performed by each module shown in FIG. 10, and implements the same technical effect, which will not be described in detail herein again to avoid repetition.

The embodiments of this application further provide a readable storage medium storing therein a program or instruction. The program or instruction, when executed by a processor, implements various processes of the embodiment of the method for processing a PDCCH monitoring capability, and may implement the same technical effect, which will not be described in detail herein again to avoid repetition.

The processor is a processor in the terminal or network-side device described in the foregoing embodiment. The readable storage medium includes a computer-readable storage medium, for example, a Read-Only Memory (ROM), a Random Access Memory (RAM), a magnetic disk, an optical disc or the like.

The embodiments of this application further provide a chip. The chip includes a processor and a communication interface. The communication interface is coupled to the processor. The processor is configured to run a program or an instruction on a network-side device to implement various processes of the embodiment of the method for processing a PDCCH monitoring capability, and may implement the same technical effect, which will not be described in detail herein again to avoid repetition.

It should be understood that the chip mentioned in the embodiments of this application may further be referred to as a system-level chip, a system chip, a chip system, a system on chip, or the like.

It is to be noted that the term "include", "comprise" or any other variation thereof in this specification intends to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of this application essentially, or the part contributing to the related art, may be presented in the form of a computer program product. The computer program product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A method for processing a PDCCH monitoring capability performed by a terminal, comprising:
    determining a physical downlink control channel (PDCCH) monitoring capability, wherein the PDCCH monitoring capability represents a restriction condition that needs to be met by a slot monitorable by the terminal; and
    sending the PDCCH monitoring capability, wherein
    the PDCCH monitoring capability comprises any one or a combination of the following:
    a monitoring occasion is only on a predetermined slot of a slot group; or
    a monitoring occasion is on any slot of a slot group; wherein
    the slot group is determined in the following manner;
    determining a quantity N of slots comprised in the slot group; and
    determining a position of the slot group based on the determined quantity N of slots; wherein
    the quantity N of slots is obtained through a capability parameter reported by the terminal, wherein the capability parameter comprises the quantity N of slots.

2. The method for processing a PDCCH monitoring capability according to claim 1, wherein the predetermined slot comprises any one of the following:
    a top preset quantity of slots in the slot group;
    a last preset quantity of slots of the slot group; or
    slots spaced by a preset quantity of slots in the slot group.

3. The method for processing a PDCCH monitoring capability according to claim 1, wherein
    in a first preset case, the monitoring occasion is only on the predetermined slot of the slot group; and
    in a second preset case, the monitoring occasion is on any slot of the slot group, wherein
    the first preset case is a condition for all search space or a condition for Type 1 with dedicated radio resource control (RRC) configuration, Type 3, and user-specific search space (USS); and
    the second preset case is a condition for all search space or a condition for Type 0, Type 0A, Type 2 common search space (CSS), and Type 1 with non-dedicated RRC configuration.

4. The method for processing a PDCCH monitoring capability according to claim 3, wherein the PDCCH monitoring capability further comprises any one of the following:
    in the first preset case, the monitoring occasion is on any slot of the slot group, or
    in the first preset case, the monitoring occasion is on any slot of the slot group, and any continuous PDCCHs meet a preset gap.

5. The method for processing a PDCCH monitoring capability according to claim 1, wherein the slot group is determined in the following manner:
    determining a set {Ni} of a quantity of slots comprised in the slot group; and
    determining a position of the slot group based on the determined set {Ni} of the quantity of slots; wherein
    the quantity N of the plurality of slots constitutes the set {Ni} of the quantity of slots.

6. The method for processing a PDCCH monitoring capability according to claim 5, wherein the set {Ni} of the quantity of slots is obtained through one of the following manners:
    obtaining through configuration of a network;

obtaining through a quantity of a plurality of physical downlink shared channels (PDSCHs) or a quantity of slots that are schedulable by a time domain scheduling parameter in downlink control information (DCI);

obtaining through a capability parameter reported by the terminal, wherein the capability parameter comprises the set {Ni} of the quantity of slots, or comprises a quantity of a plurality of PDSCHs or a quantity of slots that are schedulable by a time domain scheduling parameter in DCI; or obtaining through the set {Ni} of the quantity of slots predefined in a protocol.

7. The method for processing a PDCCH monitoring capability according to claim 6, wherein the capability parameter is one or more of the following parameters:

the quantity of slots comprised in the slot group;
a gap value between slots or slot groups; or
a blind detection (BD) budget value or a control channel element (CCE) budget value.

8. The method for processing a PDCCH monitoring capability according to claim 5, wherein the position of the slot group is determined by one of the following manners:

determining by any continuous N slots, wherein on the radio frame, the radio subframe, or slot bundling, every N slots starting from a first slot are the slot group, a last group uses a last slot of the radio frame, the radio subframe, or the slot bundling as an end slot, and a pattern of the slot group is repeated in each radio frame, radio subframe, or slot bundling;

using a slot configured by a network or reported by the terminal as a starting slot or a reference slot, and determining the position of the slot group according to the starting slot or the reference slot, and the quantity N of slots; or determining a pattern of the slot group according to a monitoring occasion configured by search space (SS).

9. The method for processing a PDCCH monitoring capability according to claim 8, wherein the determining a pattern of the slot group according to a monitoring occasion configured by search space (SS) comprises:

determining that the pattern of the slot group is repeated in each radio frame, radio subframe, or slot bundling, wherein a starting point of a first slot group is a first slot with a monitoring occasion in the radio frame, the radio subframe, or the slot bundling, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, wherein a last slot group ends at an end point of the radio frame, the radio subframe, or the slot bundling.

10. The method for processing a PDCCH monitoring capability according to claim 8, wherein the determining a pattern of the slot group according to a monitoring occasion configured by search space (SS) comprises:

determining that the pattern of the slot group is different in each radio frame, radio subframe, or slot bundling, wherein for each radio frame, radio subframe, or slot bundling, a starting point of a first slot group is a first slot with a monitoring occasion in the radio frame, the radio subframe, or the slot bundling, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, wherein a last slot group ends at the radio frame, the radio subframe, or the slot bundling.

11. The method for processing a PDCCH monitoring capability according to claim 8, wherein the determining a pattern of the slot group according to a monitoring occasion configured by search space (SS) comprises:

using the slot configured by the network or reported by the terminal as the starting slot or the reference slot, and determining the pattern of the slot group from the starting slot, or determining the pattern of the slot group from the starting slot spaced from the reference slot by a preset quantity of slots, wherein a starting point of a first slot group is a first slot with a monitoring occasion after the starting slot or a starting point slot, and N slots starting from the starting point of the first slot group are the first slot group; a starting point of a next slot group is the first slot with the monitoring occasion not in any previous slot group, and the N slots starting from the starting point of the next slot group are a slot group; and the foregoing operations are performed sequentially, to determine the pattern of the slot group.

12. The method for processing a PDCCH monitoring capability according to claim 1, wherein the slot group meets one or more of the following conditions:

a distance between slot groups is greater than or equal to a first predetermined value;

a quantity of search space SS sets configured in each slot group is less than or equal to a second predetermined value, wherein the condition is limited before search space SS dropping;

a quantity of BDs or CCEs in each slot group is less than or equal to a third predetermined value;

a quantity of monitoring occasions for each slot group is less than or equal to a fourth predetermined value, wherein the condition is before SS dropping; or a quantity of monitoring occasions for each slot in each slot group is less than or equal to a fifth predetermined value, wherein the condition is before SS dropping.

13. The method for processing a PDCCH monitoring capability according to claim 1, wherein the PDCCH monitoring capability further comprises any one or a combination of the following:

for a scheduled secondary cell (Scell), corresponding to each bandwidth part BWP, there are at most a first preset quantity of search space (SS) sets on a slot monitorable by each slot group, and the restriction is before search space SS dropping is performed;

for a frequency division duplex (FDD) system, and for each scheduled carrier component (CC), only a second preset quantity of pieces of downlink control information (DCI) for scheduling downlink (DL) unicast transmission and a third preset quantity of pieces of DCI for scheduling uplink (UL) unicast transmission are processed on a minotorable slot of each slot group; or for a time division duplex (TDD) system, and for each scheduled CC, only a fourth preset quantity of pieces of downlink control information DCI for scheduling downlink (DL) unicast transmission and a fifth preset quantity of pieces of DCI for scheduling uplink (UL) unicast transmission are processed on a minotorable slot of each slot group.

14. The method for processing a PDCCH monitoring capability according to claim 1, wherein the PDCCH monitoring capability further comprises one or more of the following:

time at which the terminal demodulates specific DCI;

a minimum K0 or K2 restriction; or earliest time at which the terminal performs physical downlink shared channel (PDSCH) buffer.

15. A method for processing for a PDCCH monitoring capability performed by a network-side device, comprising:

receiving the PDCCH monitoring capability; and sending a PDCCH based on the PDCCH monitoring capability, wherein the PDCCH monitoring capability comprises any one or a combination of the following:

a monitoring occasion is only on a predetermined slot of a slot group; or a monitoring occasion is on any slot of a slot group; wherein the slot group is determined in the following manner:

determining a quantity N of slots comprised in the slot group; and determining a position of the slot group based on the determined quantity N of slots; wherein the quantity N of slots is obtained through a capability parameter reported by the terminal, wherein the capability parameter comprises the quantity N of slots.

16. The method for processing a PDCCH monitoring capability according to claim 15, wherein the predetermined slot comprises any one of the following:

a top preset quantity of slots in the slot group;

a last preset quantity of slots of the slot group; or slots spaced by a preset quantity of slots in the slot group.

17. A network-side device, comprising:

a processor; and a memory storing a program or an instruction, wherein the program or instruction, when executed by the processor, causes the network-side device to perform the method for processing a PDCCH monitoring capability according to claim 15.

18. A terminal, comprising:

a processor; and a memory storing a program or an instruction, wherein the program or instruction, when executed by the processor, causes the terminal to:

determine a physical downlink control channel (PDCCH) monitoring capability, wherein the PDCCH monitoring capability represents a restriction condition that needs to be met by a slot monitorable by the terminal; and send the PDCCH monitoring capability, wherein the PDCCH monitoring capability comprises any one or a combination of the following:

a monitoring occasion is only on a predetermined slot of a slot group; or a monitoring occasion is on any slot of a slot group; wherein the slot group is determined in the following manner:

determining a quantity N of slots comprised in the slot group; and determining a position of the slot group based on the determined quantity N of slots; wherein the quantity N of slots is obtained through a capability parameter reported by the terminal, wherein the capability parameter comprises the quantity N of slots.

19. The terminal according to claim 18, wherein the predetermined slot comprises any one of the following:

a top preset quantity of slots in the slot group;

a last preset quantity of slots of the slot group; or slots spaced by a preset quantity of slots in the slot group.

20. The terminal according to claim 18, wherein in a first preset case, the monitoring occasion is only on the predetermined slot of the slot group; and in a second preset case, the monitoring occasion is on any slot of the slot group, wherein the first preset case is a condition for all search space or a condition for Type 1 with dedicated radio resource control (RRC) configuration, Type 3, and user-specific search space (USS); and the second preset case is a condition for all search space or a condition for Type 0, Type 0A, Type 2 common search space (CSS), and Type 1 with non-dedicated RRC configuration.

\* \* \* \* \*